(No Model.)

G. J. RECORD.
SAP SPOUT.

No. 252,514.  Patented Jan. 17, 1882.

WITNESSES:
Francis McArdle,
C. Sedgwick

INVENTOR:
G. J. Record
BY Munn & Co
ATTORNEYS.

UNITED STATES PATENT OFFICE.

GEORGE J. RECORD, OF CONNEAUT, OHIO.

SAP-SPOUT.

SPECIFICATION forming part of Letters Patent No. 252,514, dated January 17, 1882.

Application filed November 22, 1881. (No model.)

*To all whom it may concern:*

Be it known that I, GEORGE J. RECORD, of Conneaut, in the county of Ashtabula and State of Ohio, have invented a new and useful Improvement in Sap Spouts, of which the following is a full, clear, and exact description.

Reference is to be had to the accompanying drawings, forming a part of this specification, in which similar letters of reference indicate corresponding parts in all the figures.

Figure 1:
Figure 2:
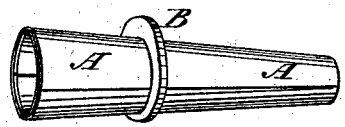
Figure 3:
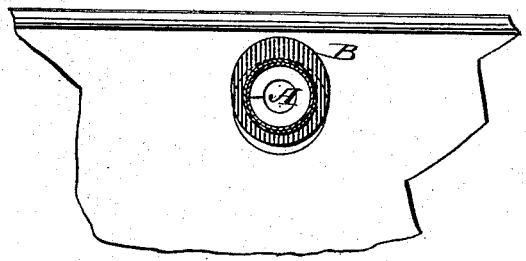
Figure 4:
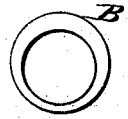

Figure 1 is a view illustrating the use of my improvement. Fig. 2 is a perspective view of the improvement. Fig. 3 is a sectional end view of the same, showing a part of a sap-bucket. Fig. 4 shows a modification of the ring-flange.

The object of this invention is to improve the construction of the sap-spouts for which Letters Patent No. 242,981 were issued to me June 14, 1881, in such a manner as to make them more convenient and reliable in use.

The invention consists in the combination, with the tapering tube, of an eccentrically-perforated ring-flange, whereby additional security is obtained against the accidental detachment of the sap-bucket, as will be hereinafter fully described.

The spout A is made tapering and with a second or auxiliary tube placed within it, the edges of each tube abutting against each other, and the joints of the two tubes are placed upon different sides of the spout. The edges of each spout are fastened together and the two spouts are connected and held in place by solder or other suitable means. Upon the middle part of the spout A is driven a ring-flange, B, which is soldered or otherwise secured in place. The ring-flange B strengthens the spout, and also serves as a guard to keep the suspended sap-bucket in place, and prevents the sap-bucket from being swung out of its place by the wind. The ring-flange B may be made in circular form, as shown in Fig. 4, and with its perforation eccentric; but I prefer to make the ring-flange oval, as shown in Fig. 3, the perforation being made toward one end. In either case the ring-flange projects upon one side of the spout A more than the other, and the said spout is driven into the tree with the wider part of the flange upward. The bucket is applied to the spout by passing the hole in the side of the bucket over the outer end of the spout, raising the bucket and inclining its bottom from the tree, so that the upper part of the said hole can be passed over the upper part of the flange B. The bucket is then allowed to swing down to its place and hang from the spout.

With this arrangement it will be impossible for the wind to detach the bucket from the spout or to swing the bucket into such a position that it will not catch the sap as it drips from the spout. With this construction, also, the eccentricity of the ring-flange increases the security of the connection of the bucket and spout and allows the hole in the side of the bucket to be made smaller than would otherwise be necessary. The flange B also allows the bucket to be swung to one side and emptied without being detached from the spout, as illustrated in Fig. 1.

Having thus described my invention, I claim as new and desire to secure by Letters Patent—

In a sap-spout, the combination, with the tapering tube A, of the eccentrically-perforated ring-flange B, substantially as herein shown and described, whereby additional security is obtained against the accidental detachment of the sap-bucket, as set forth.

GEO. J. RECORD.

Witnesses:
JAMES T. GRAHAM,
C. SEDGWICK.